United States Patent [19]

Doebler et al.

[11] Patent Number: 4,543,375
[45] Date of Patent: Sep. 24, 1985

[54] PROCESS FOR PRODUCING STORABLE CONCENTRATES AND THEIR USE FOR PRODUCING SURFACE COATINGS

[75] Inventors: Klaus P. Doebler, Radevormwald; Knut Gräf, Hattingen; Kurt E. Jäger, Wuppertal; Friedrich Johannsen, Heiligenhaus; Jürgen Ritz, Mainz-Mombach; Dietrich Saatweber, Wuppertal, all of Fed. Rep. of Germany

[73] Assignee: Herberts Gesellschaft mit beschraenkter Haftung, Wuppertal, Fed. Rep. of Germany

[21] Appl. No.: 650,070

[22] Filed: Sep. 13, 1984

[30] Foreign Application Priority Data

Sep. 14, 1983 [DE] Fed. Rep. of Germany ....... 3333073

[51] Int. Cl.$^4$ .......................... C09D 5/02; C09D 5/40; C08J 3/06; C25D 13/04
[52] U.S. Cl. .................................... 523/348; 524/901; 524/904
[58] Field of Search ............................... 524/901, 904; 204/181 C; 523/348

[56] References Cited

U.S. PATENT DOCUMENTS

| | | | |
|---|---|---|---|
| 3,869,366 | 3/1975 | Suzuki et al. | 204/181 C |
| 3,970,621 | 7/1976 | Kondo et al. | 524/901 |
| 4,017,435 | 4/1977 | Kondo et al. | 524/901 |
| 4,035,275 | 7/1977 | Sturni et al. | 204/181 C |
| 4,165,406 | 8/1979 | Tugukuni et al. | 524/901 |
| 4,230,552 | 10/1980 | Schimmel et al. | 524/901 |
| 4,388,435 | 6/1983 | Loch et al. | 524/901 |
| 4,442,244 | 4/1984 | Johannes et al. | 523/221 |

FOREIGN PATENT DOCUMENTS 2026506  2/1980  United Kingdom ............... 524/901

Primary Examiner—Ronald W. Griffin
Attorney, Agent, or Firm—Schwartz, Jeffery, Schwaab, Mack, Blumenthal & Evans

[57] ABSTRACT

Process for producing storable concentrates for producing paints containing water, undissolved, finely divided, as well as dissolved synthetic resins as paint binders, pigments, optionally paint additives and organic solvents by wet grinding in several stages, wherein (a) in a first grinding stage the undissolved synthetic resins, whereof at least 80% by weight are present with a particle size between 500 $\mu$m and 20 mm, mixed with water, the solids content representing 30 to 70% by weight, based on the total mixture quantity, as well as 0 to 60% by weight of dissolved ionic synthetic resins (solids) are ground to a particle size of less than 200 $\mu$m and preferably less than 100 $\mu$m, and (b) 40 to 100% by weight of the dissolved ionic synthetic resins (solids) and pigments are added and the mixture is ground in a second grinding stage until 95% of all the particles have a particle size of less than 15 $\mu$m.

24 Claims, No Drawings

PROCESS FOR PRODUCING STORABLE CONCENTRATES AND THEIR USE FOR PRODUCING SURFACE COATINGS

BACKGROUND OF THE INVENTION

The present invention relates to a process for producing storable concentrates containing water, undissolved finely divided synthetic resins in a quantity of 10 to 60% by weight, based on the total weight of the concentrate, and dissolved synthetic resins in a quantity of 0.5 to 10% by weight solids, based on the total weight of the concentrate, as paint binders, pigments as well as optionally paint additives and optionally organic solvents by wet grinding in a number of stages. The invention also relates to the use of the concentrates for producing surface coatings.

DISCUSSION OF PRIOR ART

No. DE-A-2,248,836 discloses producing electrophoretically depositable paints based on an aqueous suspension of water-insoluble resins and pigments in a cationic binder. As described in further detail in No. DE-A-3,024,158, this process suffers from a number of serious deficiencies with regards to the production technology. According to No. DE-A-3,024,158, these disadvantages are avoided in that there is no exclusion of the solid formulation constituents such as water-insoluble resins and pigments and in place of this technology the individual components of the formulation are jointly ground in one or more stages.

However, this technology suffers from the following disadvantage. If according to No. DE-A-3,024,158, p. 13, lines 19 to 21, the grinding is performed in a single stage, this stage must necessarily be performed wet. However, as the raw materials are normally in the form of chips or granules with edge lengths of 0.5 to 20 mm, this operation can only be realised over an unacceptably long period and accompanied by high energy expenditure. In addition, most commercially available grinding units are unable to perform the stage of reducing the size from 20 mm to 5 to 15 $\mu$m. Thus, according to the examples of No. DE-A-3,024,158, a preground solid synthetic resin is used. The dry grinding stage is linked with numerous disadvantages inherent in such a process and which are also mentioned in No. DE-A-3,024,158. In addition, the concentrates obtained according to the latter specification do not satisfy the nowadays conventionally made requirements of storability over several months and in fact after only a short time they form sediments, which cannot generally be stirred up again. However, even sediments which can be stirred up are undesired for use purposes, because the processing company wishes to pump the concentrates without any additional manipulation. The paints produced from such concentrates are used as priming coats, which often have to be provided with a finish system. This can lead to the formation of pinholes or dimples. According to No. DE-A-2,248,836, only a dry grinding is performed with the disadvantages inherent therein, but dimple and pinhole formation does not occur when making the finishing coat.

If conventional prior art wet grinding processes are performed on concentrates which contain undissolved synthetic resins, there are considerable viscosity rises, partly caused by increasing fineness of particles (increase in the total surface of the solids) and partly through the formation of microfoams. In closed grinding systems, this not only leads to a poor grinding efficiency (damping action when the grinding medium impacts with the material being ground), but linked therewith to very high shear forces, which once again lead to a considerable rise in the temperature in the grinding chamber. Due to the relative low glass transition temperatures of the resins, the resin particles then cake in the mill and the latter finally becomes blocked. This viscosity rise problem increases with the height of the solids of said concentrates. This problem can also not be solved by correspondingly reducing the solids, because this increases the tendency to form sediments.

SUMMARY OF THE INVENTION

The problem of the invention is to solve the aforementioned problems which act counter to good production, in an economically and ecologically suitable manner.

The present invention therefore relates to a process for producing storable concentrates containing water, undissolved finely divided synthetic resins in a quantity of 10 to 60% by weight, based on the total weight of the concentrate, and dissolved synthetic resins in a quantity of 0.5 to 10% by weight of solids, based on the total weight of the concentrate, as paint binders, pigments, as well as optionally paint additives and optionally organic solvents by wet grinding in several stages, whereby, for producing paints, said concentrates are diluted with liquid paint binders and optionally conventional paint additives, water and optionally organic solvents, wherein (a) in a first grinding stage the undissolved synthetic resins, whereof at least 80% by weight are present with a particle size between 500 $\mu$m and 20 mm, mixed with water, the solids content representing 30 to 70% by weight, based on the total mixture quantity, as well as 0 to 60% by weight of dissolved ionic synthetic resins (solids) are ground to a particle size of less than 200 $\mu$m and preferably less than 100 $\mu$m, and (b) 40 to 100% by weight of the dissolved ionic synthetic resins (solids) and pigments are added and the mixture is ground in a second grinding stage until 95% of all the particles have a particle size of less than 15 $\mu$m.

DETAILED DESCRIPTION OF THE INVENTION

In the process according to the invention, the solid starting resins are introduced as granules and/or chips with edge lengths of approximately 0.5 to 20 um and accompanied by stirring in water, so that a 30 to 70% by weight and preferably 40 to 50% by weight solid is obtained, it being possible to add to the water defoaming agents, e.g. nonionic compound classes with a low degree of ethoxylation, such as fatty alcohol polyglycol ether (Genapol C,O,T,X, registered trade mark) or polymers of ethylene and propylene oxide (Genapol PF 10) or nonyl phenol polyglycol ether (e.g. Arkopal N-040, registered trade mark) or tributyl phenol polyglycol ether (e.g. Sapogenat T-040, registered trade mark) or products from the compound class of acetylene glycols (e.g. Surfynol 104, registered trade mark) and the ethoxylation products thereof (e.g. Surfynols of the 400 series, such as Surfynol 440).

In the first grinding stage, grinding takes place to the aforementioned particle size. It is appropriate to use in the first stage rotor/stator mills, particularly colloid mills. Grinding preferably takes place accompanied by cooling of the grinding unit by means of cooling brine, in order to remove the heat effects resulting from the high shear forces. However, despite the presence of defoaming agents, it is sometimes not possible to completely prevent the drawing in and beating of air in the mill. It is therefore preferable to perform the grinding process of the first grinding stage also under a reduced pressure of 50 to 800 mbar, preferably 200 to 500 mbar. This leads to materials which, as a function of the solids, are more or less highly viscous. An important problem is to keep the viscosity sufficiently low in the second grinding stage to ensure that adequate grinding is possible. According to the invention, this problem is solved in a surprisingly simple manner in that ionic synthetic resins are used as the dissolved resins. Dissolved ionic synthetic resins are understood to mean those which are present in the concentrate in dissolved or emulsified form in water, optionally following the addition of organic solvents and as known to the Expert in this field. The Expert is aware of the fact that the quantity and nature of the organic solvents must be selected in such a way that the insoluble, finely divided synthetic resins contained in the concentrates are not partially dissolved.

Ionic synthetic resins are e.g. those, which acquire their water solubility or water dilutability by organic or inorganic neutralizing agents, with which they are partly, fully or over-neutralized.

It is possible to convert into the water-dilutable form synthetic resins with basic groups e.g. with phosphoric acid, acid phosphates, formic acid, acetic acid, propionic acid and/or lactic acid and synthetic resins containing acid groups, e.g. with caustic soda solution, caustic potash solution, ammonia, amines and/or alkanol amines, such as diethyl amine, triethyl amine, ethylene diamine, diethylene triamine, diisopropanol amine and dimethylethanol amine. The synthetic resins can be saturated or unsaturated. Examples are modified epoxy resins with amino groups, epoxy resins modified with Mannich bases, self-curing urethane-modified epoxy resin—amine adducts, unsaturated epoxy resin—amine adducts, polyesters, maleinate oils formed from natural oils (linseed, wood, castor and fish oils) or synthetic unsaturated oils (butadiene oil), phenolic resins, amino resins, blocked isocyanate resins and acrylate resin.

It is possible to use anionically or a cationically dissolved synthetic resin, the cationic and anionic resins used being suitable for the intended use of the paints produced from the concentrate. However, it is important for the invention that these resins are added during the grinding process, as defined hereinbefore, and not only after grinding the undissolved synthetic resins to the degree of grinding necessary for the final use. The use of ionic dissolved synthetic resins with the effect that these regulate the viscosity in the grinding stages, particularly the second grinding stage, constitutes an ideal method for producing concentrates with an extremely high degree of grinding, because said resins are an integral part of the paint surface coating produced therefrom. During grinding, it can be necessary in some cases to add agents which reduce the viscosity of the material being ground. These can be of many different types. For example, the following has proved suitable: quaternary ammonium compounds (e.g. pentaoxyethyl stearyl ammonium chloride=Genamin KS 5, registered trade mark) or hexadecyl trimethyl ammonium chloride (=Dodigen 1383, registered trade mark), aminoxyethylates such as coconut fatty amine ethoxylate (Genamin C200, registered trade mark), tallow fatty alcohol polyglycol ether with 50 mol ethoxy units (=Genapol T 500, registered trade mark) or oleyl alcohol polyglycol ether with 23 ethoxy units (Genapol 0-230, registered trade mark). It is obviously necessary to select those additives, which do not have a negative influence on the subsequent film properties. In addition, excessive foam formation must be prevented.

The undissolved synthetic resins used are those conventionally employed in the field of paint and paint powder production and as described in the Lehrbuch der Lacke und Beschichtungen, Vol. VIII, part 2, 1980, published by H. Kittel, Verlag W. A. Colomb, the chapter entitled "Powder coating".

The resin powder particles must not cake or fuse at the grinding and storage temperatures.

If a stovable or bakable paint is to be produced from the concentrates, the resin powder particles must melt during stoving or baking.

On fulfilling these criteria, the synthetic resins can be used for the concentrates which can be produced according to the invention. This also applies to synthetic resins which do not as yet form part of the prior art. The undissolved, finely divided synthetic resins can be self-crosslinking, externally crosslinking, or non-crosslinking. They can be crosslinkers or hardeners of the type conventionally used in the paints industry.

The synthetic resins are ground singly or in mixture. Mixtures are also possible, which are obtained by melting prior to grinding. It is also possible to produce solutions of several resins the mixture of the resins being obtained by evaporating the solvent. A special form is the possibility known as the master batch of incorporating additives into the synthetic resin or synthetic resin mixtures, there being no need for extrusion. Examples of the usable undissolved, finely divided, saturated or unsaturated, nonionic or ionic synthetic resins are epoxy resins, epoxy—amine adducts, modified epoxy resins with amino groups, self-curing, urethane-modified epoxy resins or epoxy resin—amine adducts, blocked isocyanate resins, polyurethanes, polyesters, epoxy resins modified with Mannich bases which are made of phenols, aldehydes and amines, polyamides, polyethers, acrylate resins, aminoacrylate resins, hydrocarbon resins, coumarone resins, coumarone—indene resins, indene resins, polyolefins, resinous cellulose derivatives and ketone resins.

Apart from epoxy, amino, isocyanate and methylol groups as the functional groups in the self-crosslinking and external-crosslinking synthetic resins, preference is given to hydroxyl groups, but carboxyl groups are also possible.

According to a special embodiment of the process according to the invention, several different solid synthetic resins can be separately ground in stages (a) and (b) and the ground materials can then be mixed together. This is particularly advantageous if, as a result of the physical properties of the different resins to be ground, different times are required for grinding to the desired degree of grinding. Thus, a difficultly grindable synthetic resin must be ground longer than an easily ground synthetic resin. This also gives greater flexibility to the user with respect to adding or omitting individual components of the formulation. The same applies when correcting paint formulations on the part of the processing company.

It is also possible to grind in paint additives and/or organic solvents in stage (a) and/or stage (b). Grinding in stage (b) preferably take place in agitator ball mills, particularly bead mills.

It is also appropriate for the concentrate to contain 30 to 50% by weight of undissolved, finely divided synthetic resins. The synthetic resin content has appropriately 0.5 to 5% by weight solids.

Following grinding stage (b), i.e. according to the process of the invention, a suspension is obtained which further thickens when left to stand, is stable when stored for several months and does not form sediment.

It is possible to admix with the ground material obtained in stage (b) of the invention fine particulate pigments and optionally paint additives, which would disturb the grinding process and/or which should not be ground.

Further planned thickening of the concentrates after grinding may be desirable. In this connection, for example, anionic surfactants are effective and even small amounts are highly effective. However, as these compound classes represent highly effective foaming agents, their use during grinding processes would lead to high foam formation, which should be avoided.

Sedimentation-preventing agents can also be added to the finished ground product. However, such agents must not be used during grinding, because they would influence the rheological behaviour.

The concentrates produced according to the invention can be transported to the consumer and can be set there by adding water and/or aqueous binder solutions, as well as other additives to the final solids content and the final desired composition. Thus, the concentrates are used for producing surface coatings, particularly electrophoretically depositable surface coatings. The surface coatings can be applied by compressed air spraying, airless spraying, dipping, brushing, tumbling, flow coating, centrifuging, pouring, rolling and foundation surfacing.

The concentrates may contain pigments, solvents and additives. The term pigments is understood to mean coloured and uncoloured, organic and inorganic colorants, which are substantially insoluble in solvents and binders and which in the subsequent system have a varying coverage or body, e.g. titanium dioxide, carbon black, phthalocyanine blue, lead silicate, strontium chromate, kaolin (aluminosilicate), talc, barium sulphate and silicon dioxide. Pigments with a very low or no coverage or body are also called fillers. Pigments with a particular size below 5 μm and BET-surfaces above 200 m2/g can only be ground in limited quantities with the other components through causing lumpy and therefore ungrindable concentrates. Sometimes it is also not possible to perform grinding due to damage to the pigment surface. It is recommended in such cases to stir in this pigment or the residual quantity thereof dry and after grinding, or preferably in the form of a readily spreadable paste.

The concentrate can contain a small amount of organic solvent. Preference is given to the use of those solvents, which are good solvents for the dissolved synthetic resin, but are non-solvents for the undissolved, finely divided synthetic resins, or which at least in the quantity used in the concentrate, do not lead to caking of the resin powder particles and the undissolved additives.

For example, alcoholic solvents, such as methanol, ethanol, propanols, butanols, diacetone alcohol, ethoxyethanol, butoxyethanol, ethylene glycol and propylene glycol are used in quantities such which do not lead to a partial dissolving of the resin powder used.

The term additives is understood to mean those substances which in relatively small quantities improve certain properties or prevent or reduce undesired properties. The concentrates can contain those additives, which have a positive effect on grinding or on handling during the grinding process, in the manner described hereinbefore. It is also possible to incorporate into the concentrate the conventional paint industry additives and which are of the type described in the Lehrbuch der Lacke und Beschichtungen, published H. Kittel, Vol. III, 1976, Verlag W. A. Colomb, pp.237 to 474. For example, an optimum distribution in the paint film is achieved through incorporating these additives into the concentrates.

EXAMPLES

The following examples describe specific embodiments of the present invention. However, the invention is not limited thereto and numerous modifications and divergences are possible.

Ionic resins used in the examples:
Production example (A) (cationic resin)

In accordance with No. DE-B-2,248,836, column 15, example 8, 800 g of a urethane-modified epoxy resin with a urethane content of 30%, a molecular weight of approximately 1400 to 1500, an epoxy equivalent weight of 650, and a hydroxy equivalent weight of 150, 56 g of diethanol amine, 200 g of 2-propanol and 200 g of ethylene glycol monoethyl ether are heated for 1 hour at 80° to 85° C. in the reflux condenser.

Following the addition of 16 g of levelling agent and 40 g of 2-propanol, the mixture is heated for a further 2 hours on the reflux condenser.

20 g of glacial acetic acid (98 to 100%) and 1808 g of completely desalinated water are added, accompanied by stirring, to the solution of the urethane-modified epoxy resin—amine adduct cooled to 60° C. and during water addition the mixture temperature is cooled to <30° C.

Production example (B) (combination of a cationic resin with polyester)

In order to produce an epoxy resin—amine adduct, in accordance with No. EP-A-12,463, p.17, example I(b), 391 g of diethanol amine, 189 g of 3-(N,N-dimethylamino)-propyl amine and 1147 g of an adduct of 1,6-diaminohexane and Cardura E 10 (registered trade mark) (molar ratio 1:2) are added to 5274 g of epoxy resin based on bisphenol A (epoxy equivalent weight approximately 472) in 2999 g of ethylene glycol monoethyl ether. The mixture is kept at 85° to 90° C. for 4 hours accompanied by stirring and then for 1 hour at 120° C.

For producing the polyester according to No. EP-A-12,463, p.17, example II(a), in a separate mixture 200 g of trimellitic anhydride are dissolved at 100° C. in 194 g of ethylene glycol monobutyl ether and are mixed with 573 g of Cardura E 10 (registered trade mark), as well as 1.8 g of benzyl dimethylamine and are heated, accompanied by stirring, at 120° C. and kept at this temperature until the acid number has dropped below 1.1 mg KOH/g of solid resin. The polyester solution is mixed with the solution of the epoxy resin—amine adduct.

Production example (C)—anionic resin 647 g of a reaction product of 80% by weight refined linseed oil and 20% by weight of maleic anhydride are reacted at 160° C. with 162 g of maleic resin (Alresat KM 201, registered trade mark) and at below 100° C. are dissolved in 82 g of triethyl amine and 1946 g of completely desalinated water.

EXAMPLE 1

59.1 kg of a bisphenol A-type epoxy resin with an epoxy equivalent weight of 890 (Beckopox EP 304, registered trade mark), 39.2 kg of a coumarone—indene resin with a melting point (capillary method) of 94° to 95° C., 92 kg of a diphenyl methane-4,4'-diisocyanate (Desmodur 44 M, registered trade mark) blocked with ε-caprolactam, 22.8 kg of an isophorone diisocyanate blocked with ε-caprolactam (IPDI adduct B 1065, registered trade mark), 4 kg of benzoin and 84 kg of a master batch of 1 kg of dibutyl tin dilaurate and 83 kg of Beckopox EP 304 (registered trade mark) are introduced, accompanied by stirring, into a mixture of 416.6 kg of completely desalinated water, 8 kg of Surfynol 104 (registered trade mark) and 16.3 kg of the cationic binder referred to in production example (A) and are ground in a rotor—stator mill, with the aid of cooling brine and a clearance of 2 to 0.05 mm, for 30 minutes in circulation at approximately 3000 1/h and a grinding temperature rising to 32° C., a particle size distribution according to table 1 being obtained. Prior to grinding, the Beckopox EP 304, coumarone—indene resin, IPDI adduct B 1065 and master batch are in the form of chips and benzoin is in the form of powder.

To the water—resin slurry obtained in this way are added, accompanied by stirring, 64 kg of titanium dioxide of the rutile type, 2 kg of carbon black, 20 kg of silicon dioxide (max. particle size 5 μm, BET surface 400), 28 kg of cationic binder according to the production example A) and 99.6 kg of completely desalinated water. The mixture is finely ground on an agitator ball mill with bead filling and a capacity of 200 kg/h in three individual passes, a particle size distribution according to table 2 being obtained.

TABLE 1

| Measuring range limits (μm) | % proportion (cumulative) |
|---|---|
| up to 1 μm | 5.7% |
| up to 1.5 " | 7.3% |
| up to 2 " | 11.8% |
| up to 3 " | 16.3% |
| up to 4 " | 21.2% |
| up to 6 " | 24.6% |
| up to 8 " | 30.6% |
| up to 12 " | 35.4% |
| up to 16 " | 41.8% |
| up to 24 " | 49.5% |
| up to 32 " | 56.9% |
| up to 48 " | 72.0% |
| up to 64 " | 81.2% |
| up to 96 " | 95.9% |
| up to 128 " | 96.9% |
| up to 192 " | 100.0% |

TABLE 2

| Measuring range limits (μm) | % proportion (cumulative) |
|---|---|
| up to 1 μm | 19.5% |
| up to 1.5 " | 23.2% |
| up to 2 " | 30.6% |
| up to 3 " | 39.6% |
| up to 4 " | 51.4% |
| up to 6 " | 61.8% |
| up to 8 " | 77.1% |
| up to 12 " | 90.9% |
| up to 16 " | 98.5% |
| up to 24 " | 99.8% |

TABLE 2-continued

| Measuring range limits (μm) | % proportion (cumulative) |
|---|---|
| up to 32 " | 100.0% |
| up to 48 " | — |
| up to 64 " | — |
| up to 96 " | — |
| up to 128 " | — |
| up to 192 " | — |

EXAMPLE 2

In 990 g of the wet-ground water—resin—pigment slurry produced according to example 1 are stirred 10 g of silicon dioxide with an average particle size of 5 μm and with a pore volume of 1.2 ml/g using a dissolver. The slurry have a storage stability of at least 3 months and there is no sedimentation in this period.

EXAMPLE 3

1222 g of completely desalinated water are mixed, accompanied by stirring, with 630 g of cationic resin from production example (A) and then with 597 g of the slurry produced according to example 1. Following a 15 minute ultrasonic treatment according to No. EP-A-63, 314, 551 g of completely desalinated water are added. The electric dipping bath is set to a pH-value of 5.2 with acetic acid.

From the electric dipping bath, paints films are cathodically deposited on zinc-phosphated steel plates, followed by rinsing with water and pregelling at elevated temperature (10 minutes at 100° C. in the drier) as well as curing at the stoving or baking temperature (15 minutes, 175° C. object temperature).

The coatings having a smooth, glossy surface and a thickness of approximately 45 μm are provided with a cross cut and are subjected to salt spraying according to DIN 50 021. After 1000 hours, there is a less than 1 mm migration below the cut. The film is free from surface corrosion and blisters.

EXAMPLE 4

In the same way as described in example 3 an electric dipping bath of 1222 g of completely desalinated water, 630 g of cationic resin from production example (A), 585 g of slurry has according to example 2 and 563 g of completely desalinated water is prepared. The cathodically coated paint films, stoved after pregelling and obtained from this bath are smooth and less glossy than the films obtained in example 3. 43 to 48 μm coatings are provided with a cross cut and are treated for 1000 hours in the salt spray chamber used in example 3. The film remains free from blisters and surface corrosion. The migration under the cut is less than 1 mm.

EXAMPLE 5

725 g of the combination produced according to production example (B) are mixed, accompanied by stirring, with 3 g of lead octoate (lead content 31%) and with 41 g of formic acid—50% in water.

Accompanied by further stirring, 3336 g of completely desalinated water and 910 g of the slurries produced in example 1 are added. Following a 15 minute ultrasonic treatment, zinc-phosphated steel plates are cathodically coated from the 30° C. electric dipping bath with 100 V and a coating time of 2 minutes. The uniform structural paint obtained after pregelling (10 minutes at 100° C.) and stoving (20 minutes at 180° C.)

is hard, elastic and has a coating thickness of 23 to 26 μm.

EXAMPLE 6

Using the same production method and a similar formulation to that described in example 1, a resin—water slurry is produced without cuomarone—indene resin, but with the anionic resin of production example 3.

As pigments for grinding on the bead mill to water—resin slurry, only 2 kg of carbon black, 4 kg of aluminosilicate and 1.2 kg of silicon dioxide are used.

From 600 g of this concentrate, an electric dipping bath is produced with 800 g of anionic resin from production example (C) and 900 g of completely desalinated water with a temperature of 25° C. Both non-pretreated and zinc-phosphated steel plates are anodically coated for 2 minutes with 280 V. The paint films have, after pregelling and stoving, a smooth, hard and elastic surface with coating thicknesses of 18 to 20 μm on both substrates.

On the inside of a gripping sleeve from two steel plates of Bonder 858 (Zinc phosphating, registered trade mark) of length 190 mm, width 104 mm and spacing 3 mm, following deposition for 3 minutes at 280 V, a total range of 17 cm and a 5 μm dry coating thickness 12 cm from the lower plate edge is obtained.

What is claimed is:

1. A process for producing a storable concentrate of finely divided synthetic resin useful in surface coating compositions, comprising:
   wet grinding in a first grinding stage, a mixture of undissolved synthetic resin and water, the undissolved resin having a particle size of less than 200 μm after said first stage;
   adding to the ground mixture a quantity of soluble synthetic resin in an amount such that the total amount of soluble resin in the mixture is sufficient to maintain a viscosity low enough to ensure adequate further grinding; and
   further grinding the mixture in a second grinding stage to produce a storable concentrate wherein at least 95% of the undissolved particles have a particle size of less than about 15 μm.

2. The process of claim 1, wherein from 0 to about 60 weight percent of the total amount of soluble synthetic resin needed to maintain viscosity is added in the first stage.

3. The process of claim 2, wherein the total amount of soluble synthetic resin added is from about 0.5 to about 10 weight percent of the storable concentrate.

4. The process of claim 3, wherein the undissolved synthetic resin is ground to a particle size of less than about 100 μm in the first stage.

5. The process of claim 4, further including adding to the storable concentrate, after grinding, additional ingredients selected from the group consisting of finely divided pigments and additives, said additional ingredients having an undesirable effect if present during grinding.

6. The process of claim 5, wherein pigments are added to the mixture prior to grinding in the first stage.

7. The process of claim 6, wherein additional ingredients selected from the group consisting of paint additives and organic solvents are added to the mixture prior to grinding in the second stage.

8. The process of claim 7, wherein a plurality of mixtures containing different soluble and undissolved synthetic resins are ground separately and thereafter combined to form the storable concentrate.

9. The process of claim 8, wherein the first grinding stage is effected with a rotor/stator mill.

10. The process of claim 9, wherein the rotor/stator mill is a colloid mill.

11. The process of claim 10, wherein the second grinding stage is effected with one or more agitator ball mills.

12. The process of claim 11, wherein the agitator ball mill is a bead mill.

13. The process of claim 12, wherein the grinding takes place at a reduced pressure of from about 50 to about 800 millibars.

14. The process of claim 13, wherein the reduced pressure is from about 200 to about 500 millibars.

15. The process of claim 14, including cooling the mill during one or both grinding stages.

16. The process of claim 15, wherein the storable concentrate contains from about 30 to about 50 weight percent undissolved synthetic resin.

17. The process of claim 16, wherein the storable concentrate contains from about 0.5 to about 5 weight percent of soluble synthetic resin.

18. A storable concentrate composition useful in surface coatings, comprising:
   undissolved, finely divided synthetic resin, soluble synthetic resin, and water prepared according to the process of claim 1.

19. The composition of claim 18, wherein the undissolved synthetic resin is present in amounts of from about 10 to about 60 weight percent of the composition, and the soluble synthetic resin is present in amounts of from about 0.5 to about 10 weight percent of the composition.

20. The composition of claim 19, wherein at least about 95% of the undissolved resin particles have a particle size of less than about 15 μm.

21. The composition of claim 20, wherein the composition contains additional ingredients selected from the group consisting of pigments, paint additives, and organic solvents.

22. The composition of claim 21, wherein the undissolved synthetic resin is selected from the group consisting of epoxy resins, epoxy—amine adducts, modified epoxy resins containing amino groups, self—curing urethane—modified epoxy resins, epoxy resin—amine adducts, blocked isocyanate resins, polyurethanes, polyesters, epoxy resins modified with phenolic, aldehyde and amine—type Mannich bases, polyamides, polyethers, acrylate resins, aminoacrylate resins, hydrocarbon resins, coumarone resins, coumarone—indene resins, indene resins, polyolefins, resinous cellulose derivatives, ketone resins, and combinations thereof.

23. The composition of claim 22, wherein the soluble synthetic resin is the reaction product of an acid or a base and a resin selected from the group consisting of modified epoxy resins with amino groups, epoxy resins modified with Mannich bases, self—curing urethane—modified epoxy resin—amine adducts, unsaturated epoxy resin—amine adducts, polyesters, maleinate oils formed from natural oils or from synthetic unsaturated oils, phenolic resins, amino resins, blocked isocyanate resins, acrylate resins, and combinations thereof.

24. The process of claim 1, wherein in the first grinding step the mixture of undissolved synthetic resin and water further comprises a quantity of soluble synthetic resin.

* * * * *